United States Patent [19]
Ou

[11] Patent Number: 5,498,086
[45] Date of Patent: Mar. 12, 1996

[54] OIL FILM-DEPOSIT BEARING

[76] Inventor: Chin-Sung Ou, P.O. Box 22765, Taipei, Taiwan

[21] Appl. No.: 381,313

[22] Filed: Jan. 31, 1995

[51] Int. Cl.⁶ ............................................. F16C 33/32
[52] U.S. Cl. .................. 384/491; 384/513; 384/565; 384/569; 384/625
[58] Field of Search ..................... 384/491, 492, 384/513, 565, 566, 567, 568, 569, 570, 571, 625

[56] References Cited

U.S. PATENT DOCUMENTS

| | | | |
|---|---|---|---|
| 4,893,387 | 1/1990 | Akamatsu et al. | 384/491 |
| 5,064,298 | 11/1991 | Hibi et al. | 384/565 |
| 5,145,267 | 9/1992 | Takata et al. | 384/565 |
| 5,397,188 | 3/1995 | Yoshizuka et al. | 384/565 |

Primary Examiner—Lenard A. Footland

[57] ABSTRACT

This invention relates to an oil film-deposit bearing, the oil film-deposit bearing being composed of an outer ring, an inner ring and a plurality of rolling means, the inner circumference of the outer ring and the inner ring having respectively an arc groove, on the surface of the arc grooves having a plurality of capillary holes, the rolling means being installed between the arc grooves of the outer ring and the inner ring and can roll between them, on the outer surface of the rolling means having a plurality of capillary holes, the oil or grease added on the contacting surface between the rolling means and the arc grooves would deposit in these capillary holes, once the oil film-deposit bearing rotating with shaft, the oil or grease deposited in the capillary holes would flow out to form an oil film on the contacting surface between the rolling means and the arc grooves, thus the oil film-deposit bearing can lubricate itself and prevent the oil or grease from throwing out in high speed rotation.

3 Claims, 3 Drawing Sheets

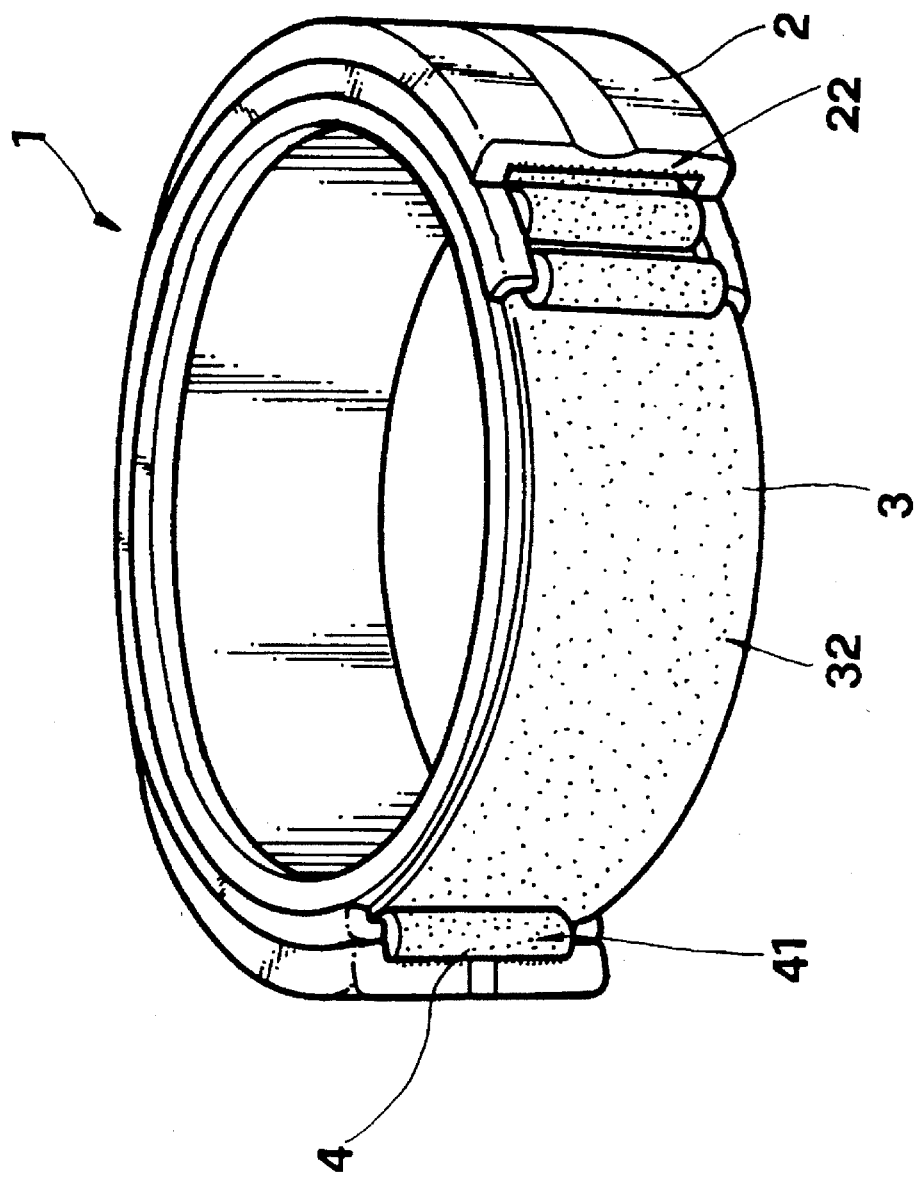

OIL FILM-DEPOSIT BEARING

BACKGROUND OF THE INVENTION

This invention relates to an oil film-deposit bearing, the oil film-deposit bearing being composed of an inner ring, an outer ring and a plurality of rolling means; the inner circumference of the inner ring and the outer ring having respectively an arc groove so as to make the rolling means can roll between them, the surface of the rolling means having a plurality of capillary holes, therefore the oil or grease on the rolling means can be deposited in the capillary holes, once the oil film-deposit rotating with shaft, the oil or grease deposited in the capillary holes would flow out to form an oil film on the contacting surface between the rolling means and the arc grooves, thus the oil film-deposit bearing can lubricate itself and prevent the oil or grease from throwing out in high speed rotation.

In modern industry field, the bearings have been used widely in many sorts of machine, but the conventional bearings having some deficiencies such as followings described: (1) The grease attached on the conventional bearing would be thrown out in high speed rotation. Because the outer surface of the roller of the conventional bearing is the smoother the better to get a smooth rotation, so it is diffcult for the grease to attach on the roller surface in high speed rotation, thus the service life of conventional bearing usually only having one to two month under the condition of high speed rotation. (2) The conventional bearing may crack under high temperature, if the bearing being used in high speed rotation for a long time, the surface of bearing would cause a high temperature. However the heat dissipating capacity of conventional bearing is bad, so the surface of the bearing may crack under high temperature.

Accordingly, the conventioal bearing have some deficiencies in high speed rotation and high temperature. As to the bearing manufactured by powder metallurgy method, it can deposit oil or grease by means of its voidage porosity, so the kind of bearing having self-lubricating capacity under rotation, but such kind of bearing having some deficiencies too, such as: (1) the manufacturing cost of the bearing produced by powder metallurgy method being higher than the conventional bearing, (2) the bearing produced by powder metallurgy method can't afford bigger force, it would break easily in high speed rotation.

SUMMARY OF THE INVENTION

It is therefore the main object of this invention to provide an oil film-deposit bearing, the oil film-deposit bearing being composed of an inner ring, an outer ring and a plurality of rolling means; the inner circumference of the inner ring and the outer ring having respectively an arc groove on which have a plurality of capillary holes, the rolling means being installed between the arc grooves of the inner ring and can roll freely between the arc grooves, the surface of the rolling means having a plurality of capillary holes, therefore the oil or grease on the rolling means can be deposited in the capilary holes, once the oil film-deposit bearing rotating with shaft, the oil or grease would form an oil film on the contacting surface between the rolling means and the arc grooves, therefore the oil film-deposited bearing can be used in high speed rotation and high temperature by means of its self-lubricating capacity.

BRIEF DESCRIPTION OF THE DRAWINGS

In the drawings, which illustrate the preferred embodiments and modes of operation of the invention, and in which like reference characters designate the same or similar parts throughout the several views:

FIG. 3 is a perspective view showing another embodiment of this invention.

DETAILED DESCRIPTION OF THE PREFERRED EMBODIMENT

Figure 1:
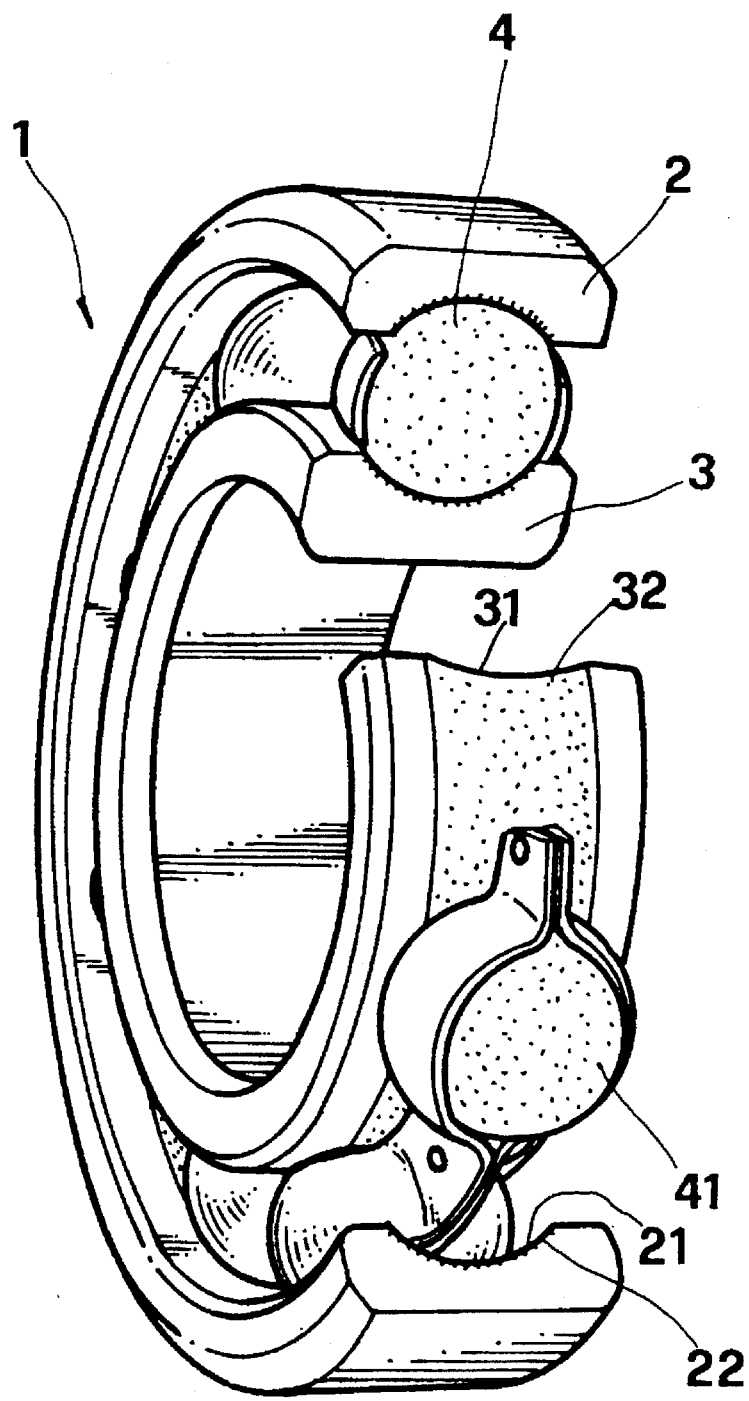
FIG. 1 is a perspective view showing an oil film-deposit bearing of the present invention.

Referring to FIG. 1, the present invention, oil film-deposit bearing (1), is composed of an outer ring (2), an inner ring (3) and a plurality of rolling means (4), wherein the inner circumference of the outer ring (2) and the inner ring (3) having respectively an arc groove (21) and (31), on the surface of the arc grooves (21) (31) having respectively a plurality of capillary holes (22) (32). The rolling means (4) are installed between the arc grooves (21) (31) and can roll freely between them, furthermore the surface of the rolling means (4) also having a plurality of capillary holes (41), the diameter of the capillary holes (22), (32) and (41) being from 0.1 μm to 1 μm, the depth being from 0.5~3 μm and the distributed density being 1 capillary hole/1 mm.

If the diameter of the capillary holes (22), (32) and (41) is too small or too big, the oil or grease can't be deposited in the capillary holes (22), (32) and (41).

Figure 2:
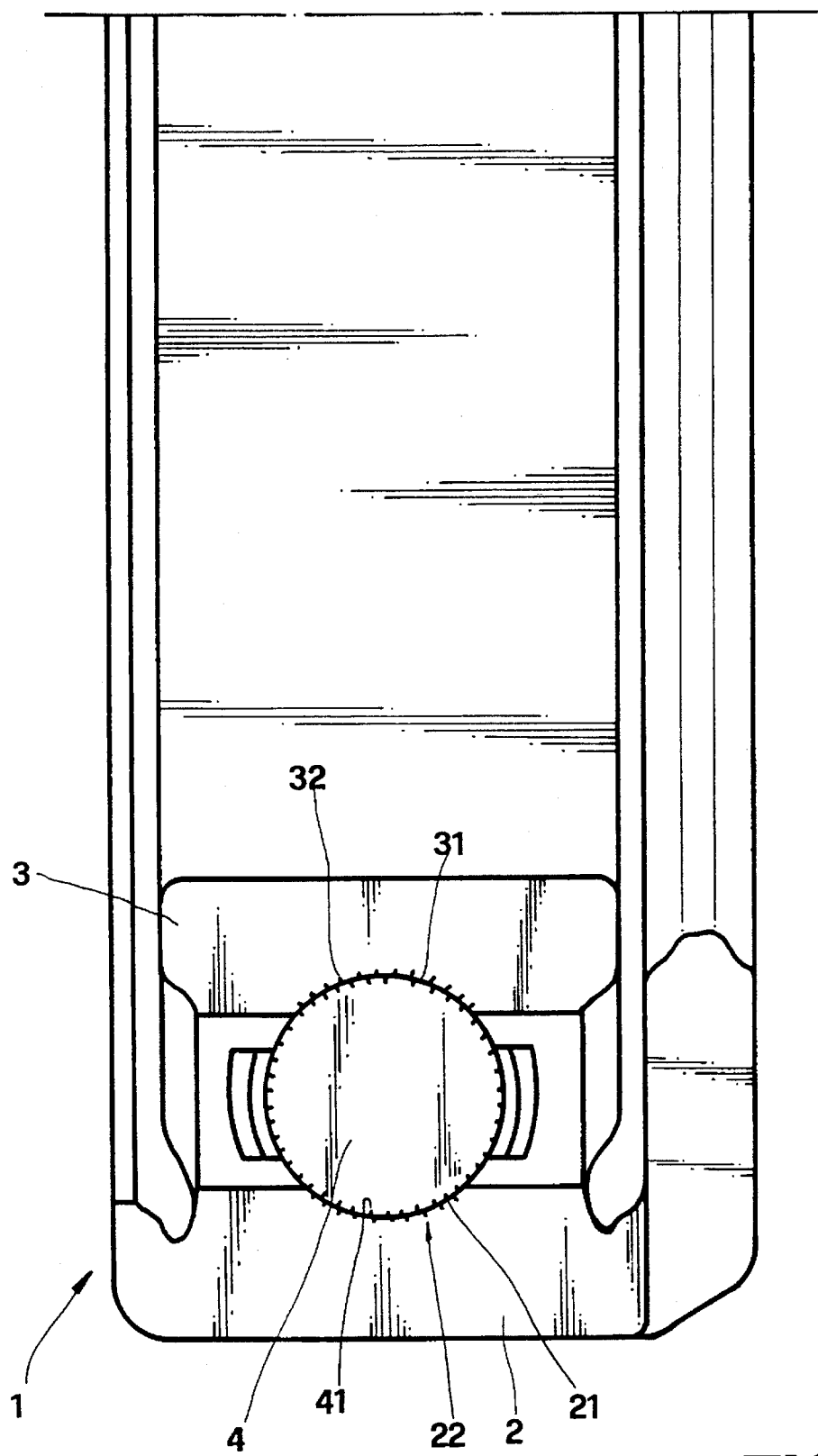
FIG. 2 is a partial sectional view of this invention.

Referring to FIG. 2, the oil or grease should be added on the contacting surface between the rolling means (4) and the arc grooves (21) (31) to get a smooth rotation, furthermore the oil or grease added would be deposited in the capillary holes (41) of the rolling means (4) and the capillary holes (22) (32) of the arc grooves (21) (31). Once the oil film-deposit bearing (1) rotates with shaft, the oil or grease deposited in the capillary holes (22), (32) and (41) would flow out to form an oil film on the contacting surface between the rolling means (4) and the arc grooves (21) (31), therefore the oil film-deposit bearing (1) can lubricate itself and prevent the oil or grease from throwing out in high speed rotation, furthermore the capillary holes (41) of the rolling means (4) would expand when the rolling means (4) rotating in high temperature, therefore the rolling means (4) having excellent heat dissipating capacity to prevent the rolling means from cracking under high temperature.

Referring to FIG. 3, the another embodiment of this invention, the rolling means is composed of a plurality of rollers (4) on which having a plurality of capillary holes (41), the rollers (4) being located between the outer ring (2) and the inner ring (3), the surface of the outer ring (2) and the inner ring (3) having respectively a plurality of capillary holes (22) (32). Once the oil film-deposit bearing (1) rotates with shaft, the oil or grease deposited in the capillary holes (22), (32) and (41) would flow out to form an oil film on the contacting surface between the rollers (4) and the arc grooves (21) (31), therefore the oil film-deposited bearing (1) having excellent self-lubricating capacity, furthermore the oil or grease don't be thrown out in high speed rotation.

It is understood by those skilled in the art that the foregoing description is a preferred embodiment of the disclosed device and that various changes and modifications may be made in the invention without departing from the spirit and scope thereof.

What is claimed is:

1. An oil film-deposit bearing comprising:
    an outer ring, the inner circumference of said outer ring having at least one or more arc groove, on the surface of said arc groove having a plurality of capillary holes;

an inner ring, the inner circumference of said inner ring having at least one or more arc groove, on the surface of said arc groove having a plurality of capillary holes;

a plurality of rolling means, the outer surface of each said rolling means having a plurality of capillary holes, said rolling means being installed between said arc grooves of said outer ring and said inner ring and can roll freely between said arc grooves;

the oil film-deposit bearing characterized in that:

the oil or grease added on the contacting surface between said rolling means and said arc grooves would be deposited in said capillary holes of said rolling means and said capillary holes of said outer ring and said inner ring, once the oil film-deposit bearing rotating with shaft, the oil or grease deposited in the capillary holes flowing out to form an oil film on said contacting surface between said rolling means and said arc grooves, thus the oil film-deposit bearing can lubricate itself and prevent the oil or grease from throwing out in high speed rotation.

2. An oil film-deposit bearing as claimed in claim 1, wherein said rolling means can be a plurality of rollers or balls.

3. An oil film-deposit bearing as claimed in claim 1, wherein the diameter of said capillary holes being from 0.1~1 μm, the depth being from 0.5~3 μm, the distributed density being 1 capillary hole/1 mm.

\* \* \* \* \*